(12) United States Patent
K et al.

(10) Patent No.: US 7,165,061 B2
(45) Date of Patent: Jan. 16, 2007

(54) TRANSACTION OPTIMIZATION OF READ-ONLY DATA SOURCES

(75) Inventors: Venugopal Rao K, Kamataka (IN); Ajay Kumar, Bangalore (IN); Bala Dutt, Bangalore (IN); Sankara R. Bhogi, Bangalore (IN); Srinivasan Kannan, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 772 days.

(21) Appl. No.: 10/355,991

(22) Filed: Jan. 31, 2003

(65) Prior Publication Data

US 2004/0153450 A1    Aug. 5, 2004

(51) Int. Cl.
*G06F 17/00*    (2006.01)

(52) U.S. Cl. .............................................. 707/2; 707/1

(58) Field of Classification Search .................... 707/1, 707/2, 3, 4, 5, 10, 201, 104.1, 202, 203; 717/100; 714/19
See application file for complete search history.

(56) References Cited

U.S. PATENT DOCUMENTS

| | | | | |
|---|---|---|---|---|
| 5,335,343 A * | 8/1994 | Lampson et al. | ............. | 714/19 |
| 5,504,899 A | 4/1996 | Raz | ............. | 707/10 |
| 5,504,900 A | 4/1996 | Raz | ............. | 707/10 |
| 5,630,081 A | 5/1997 | Rybicki et al. | ............. | 715/839 |
| 5,701,480 A | 12/1997 | Raz | ............. | 718/101 |
| 6,038,587 A | 3/2000 | Phillips et al. | ............. | 718/101 |
| 6,243,737 B1 | 6/2001 | Flanagan et al. | ............. | 709/202 |
| 6,272,675 B1 * | 8/2001 | Schrab et al. | ............. | 717/100 |
| 6,421,688 B1 | 7/2002 | Song | ............. | 707/203 |
| 6,442,618 B1 | 8/2002 | Phillips et al. | ............. | 719/315 |
| 6,832,238 B1 | 12/2004 | Sharma et al. | ............. | 709/201 |
| 6,854,646 B1 | 2/2005 | Ieshima et al. | ............. | 235/380 |
| 6,862,573 B1 | 3/2005 | Kendall et al. | ............. | 705/7 |
| 6,873,995 B1 | 3/2005 | Laue et al. | ............. | 707/103 R |
| 2002/0124083 A1 | 9/2002 | Jeyaraman et al. | ......... | 709/225 |
| 2004/0088413 A1 | 5/2004 | Bhogi et al. | ................ | 345/163 |
| 2004/0153349 A1 | 8/2004 | K et al. | ......................... | 705/7 |
| 2004/0153383 A1 | 8/2004 | K et al. | ....................... | 705/35 |
| 2004/0215473 A1 | 10/2004 | Bhogi et al. | .................... | 705/1 |
| 2004/0215894 A1 | 10/2004 | Bhogi et al. | ................ | 711/141 |
| 2004/0216109 A1 | 10/2004 | Bhogi et al. | ................ | 718/101 |
| 2005/0015353 A1 | 1/2005 | Kumar et al. | .................. | 707/1 |
| 2005/0015425 A1 | 1/2005 | Kumar et al. | ............... | 709/200 |
| 2005/0055325 A1 | 3/2005 | Dutt et al. | ..................... | 707/1 |
| 2005/0066155 A1 | 3/2005 | Dutt et al. | ..................... | 713/1 |

OTHER PUBLICATIONS

Manolis Marazakis, Distributed Systems, University of Crete, Sep. 2002; pp. 1-31.*
Oracle9i JDBC Developer's Guide and Reference (Mar. 2002, retrieved from http://www.stanford.edu/dept/itss/docs/oracle/9i/java.920/a96654/toc.htm on Sep. 6, 2005).

(Continued)

*Primary Examiner*—Apu M. Mofiz
(74) *Attorney, Agent, or Firm*—Robert C. Kowert; Meyertons, Hood, Kivlin, Kowert & Goetzel, P.C.

(57) ABSTRACT

A system and method for excluding from a transaction accesses to one or more data sources marked as read-only. Data sources may be designated as read-only at a data source level, connection level, or on a registry. A global transaction may be delayed until two or more non-read-only data sources are being used. A transaction involving multiple data sources may still be managed as a non-global transaction if only one of the data sources is non-read-only. The other read-only data sources may be left out of the transaction.

52 Claims, 10 Drawing Sheets

OTHER PUBLICATIONS

Kannegaard (J2EE BluePrints, Mar. 20, 2000 retrieved from http://java.sun.com/blueprints/guidelines/designing_enterprise_applications/apmTOC.html on Sep. 6, 2005).

Liu et al., "Designing a Test Suite for Empirically-based Middleware Performance Prediction," Australian Computer Society, Inc., (2002), (8 Pages).

"Java™ 2SDK, Enterprise Edition 1.3.1 Configuration Guide," http://java.sun.som/j2ee/sdk_1.3/techdocs/release/ConfigGuide.html, Jan. 3, 2002, (16 Pages).

Ellis et al., :JDBC™ 3.0 Specification—Final Release, Sun Microsystems, Inc., Oct. 2001, (190 pages).

"iPlanet Application Server 6.0 Administration Guide: Chapter 4 Logging Server Messages," http://docs.sun.com/source/816-5720-10/adlog.htm, Sep. 5, 2000, (21 Pages).

"JDBC™ Data Access API—The JDBC API Universal Data Acess for the Enterprise," java.sun.com, Aug. 10, 2003, (5 Pages).

"Connection Pooling," Advanced Programming for the Java 2 Platform, Aug. 16, 2002, (4 Pages).

Siva Visveswaram, "Manage Acess to Shared, Server-Side Resources for High Performance—Dive Into Connection Pooling with J2EE," JavaWorld, Oct. 2000, (8 Pages).

"Interface DataSource," DataSource (Java 2 Platform, SE v1.4.1), 2002, (1 Page).

"Initial Context," JNDI 1.2.1 Specification: Class Initial Context, http://java.sun.com/products/jndi/1.2/javadoc/javax/naming/InitialContext.html, Jul. 14, 1999, (1 Page).

JNDI—Java™ Naming & Directory Interface™, Sun Microsystems, Inc., http://java.sun.com/jndi, May 15, 2003, (2 Pages).

"iPlanet Application Server 6.0 Administration Guide: Chapter 9 Administering Transactions," http://docs.sun.com/source/816-5784-10/adtrans.htm, Sep. 5, 2000, (11 Pages).

Breitbart et al., "Replication and Consistency Being Lazy Helps Sometimes," PODS '97, Jun. 1997, (pp. 173-184).

Patricia Serrano-Alvarado et al. "Mobile Transaction Supports for DBMS". In 17ièmes Journées Bases de Données Avancées, Agadir, Maroc, Oct. 2001, (19 Pages).

Efficient and Flexible Methods for Transient Versioning of Records to Avoid Locking by Read-Only Transactions, 1992 ACM SIGMOD, Jun. 1992, (pp. 124-133).

BEA WebLogic Enterprise 5.1, BEA System, Inc., 2000, (13 Pages).

"Simplified Guide to the Java TM 2 Platform Enterprise Edition," Sun Microsystems, Inc., 1999, (13 Pages).

Dogac et al., "METU Interoperable Database System," Demo Description, In Proc. Of ACM Sigmod Intl. Conf. On Management of Data, Jun. 1996, (6 Pages).

* cited by examiner

TRANSACTION OPTIMIZATION OF READ-ONLY DATA SOURCES

BACKGROUND OF THE INVENTION

1. Field of the Invention

The invention relates to computer systems and computer software, and more particularly to transaction management in computer systems.

2. Description of the Related Art

Computer programs executing on application servers may need to access and modify data sources coupled to the application server. A data source may be an interface to a resource manager, such as a database. The terms resource manager and data source may be used interchangeably. Before a program starts, an application server may start a new transaction and open connections to needed data sources. When application servers establish a connection to a data source, the connection can be opened as a non-global transaction connection or a global transaction connection. A non-global transaction involving a one phase commit may be used when accessing only one data source. A global transaction involving a two phase commit may be used when accessing two or more different data sources. In conventional systems, once the application server opens a specific type of connection (i.e. non-global or global) the connection type may be restricted to the initial connection type.

Non-global transactions may be managed by a resource manager. Global transactions may be managed by an external transaction manager such as a Java Transaction server on an application server. Global transactions may also involve a two phase commit protocol. Before a transaction is committed to the connected data sources, each data source may be asked to prepare to commit. If each data source is able to commit, it may send a signal to the transaction manager indicating so. After all of the data sources have indicated that they are prepared to commit, the transaction manager may send a signal to commit the transaction and record the transaction in a transaction log. If the data source is prepared to commit, it commits the transaction when instructed to by the application server. Non-global transactions involving one data source do not need to use the first phase (i.e. asking if the data source is prepared to commit).

A transaction log may be updated with information on transactions that have been committed. The information for a committed transaction may be sent to the data source that failed during the commit to allow the data source to update itself. If a transaction fails, or doesn't commit, the data sources involved may be rolled back. The data sources may return their stored data to the state the data was in before the transaction started.

When a read-only data source is connected to by an application as part of a global transaction, it's participation in a transaction may be optimized during the two-phase commit process. A read-only data source may indicate it is read-only when a transaction manager starts the two phase commit protocol (e.g. during the prepare phase). The commit phase may be skipped for a read-only resource in a global transaction since its state is not modified.

SUMMARY

In one embodiment, a memory may be coupled to one or more processors and be configured to store program instructions. The program instructions may be executable by the one or more processors to implement an application. The application may be configured to request access to one or more data sources during a transaction. One or more of the data sources may be marked as read-only. The program instructions may also be executable to implement an application server configured to manage the transaction. The application server may be configured to exclude from the transaction accesses to the one or more data sources marked as read-only.

In one embodiment, a request may be received to begin a transaction. A request for a connection to a data source for a data source may also be received. If the data source is marked as read-only, the connection may be returned without enlisting the connection in the transaction. If the data source is not marked as read-only, the connection may be returned and the connection may be enlisted within the transaction.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
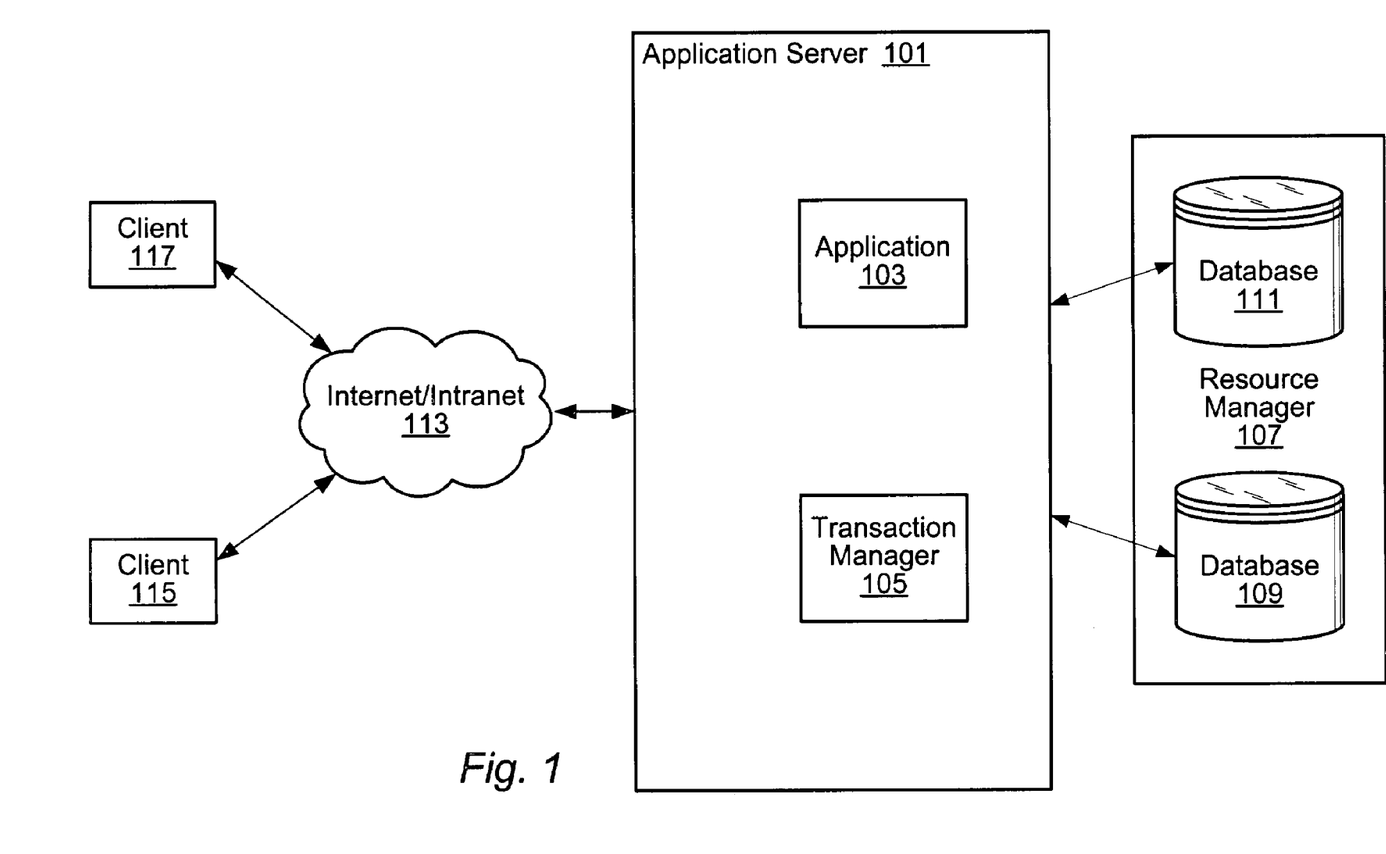
FIG. 1 shows an embodiment of an application server on an internet running an application and accessing a database connected to the application server.

Referring to FIG. 1, an embodiment is shown in the form of an application server 101 running an application 103. The application 103 may be accessed by a client, such as client 115 or 117, over a network 113, such as but not limited to the Internet, a non-global network or a combination of networks. In addition, the application server 101 may be accessed by a client 115 and 117 without a network 113 (e.g. a non-global client such as a web server). The application 103 may access a data source such as database 109 or 111, managed by a resource manager 107. The resource manager 107 may comprise a relational database server. Other resource managers may also be within the scope of the invention.

The application 103 may access one database, such as but not limited to database 109, as part of a transaction, and the application 103 may manage the transaction with the database 109 as a non-global transaction. The non-global transaction may use a one phase commit protocol. The one phase commit protocol may involve instructing the data source 109 to commit the transaction. If the application 103 accesses two or more databases, such as databases 109 and 111, the application 103 may use a transaction manager, such as but not limited to transaction manager 105, to manage a global transaction with the database 109 and database 111. The global transaction may be handled by a transaction manager such as but not limited to a Java Transaction Service (JTS) transaction manager.

The global transaction may be handled with a two phase commit protocol. In the two phase commit protocol, the transaction manager 105 may first ask each data source involved in the transaction if the data source is prepared to commit the transaction. For example, the transaction manager 105 may send an inquiry to the resource managers for database 109 and database 111 to determine if the data sources involved in the transaction are prepared to commit the transaction. If all the data sources involved in the transaction give an affirmative response, the transaction may be recorded in a transaction log and the data sources may be instructed by the transaction manager 105 to commit the transaction.

In one embodiment, in response to an initial transactional access by an application 103 to a first one of a plurality of data sources, such as database 109 and database 111, the application server 101 may be configured to provide to an application 103 a non-global transaction connection for a first data source and manage the transaction as a non-global transaction. If one or more other data sources different from the first one are subsequently accessed by the application 103, the application server 101 may be configured to provide a global transaction connection to each other data source and change the transaction to be managed as a global transaction. For example, if application 103 request a connection to database 109 as the first data source used in a transaction, the transaction with database 109 may be managed as a non-global transaction. If within the transaction the application 103 accesses database 111 after accessing database 109, the application server may change management of the transaction involving database 109 and database 111 to using a transaction manager.

Figure 2:
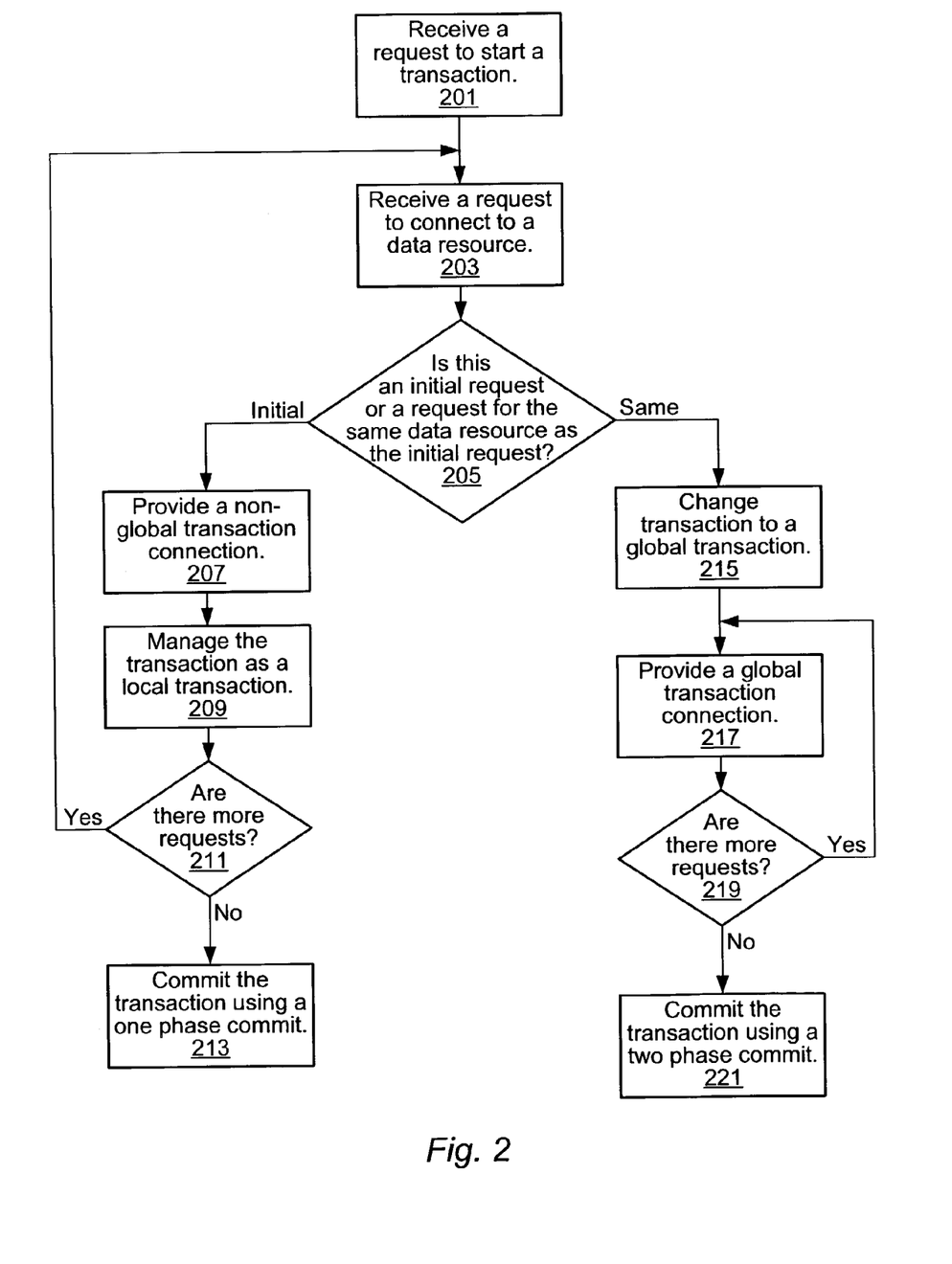
FIG. 2 shows an embodiment of a flowchart for changing a non-global transaction to a global transaction.
Figure 3A:
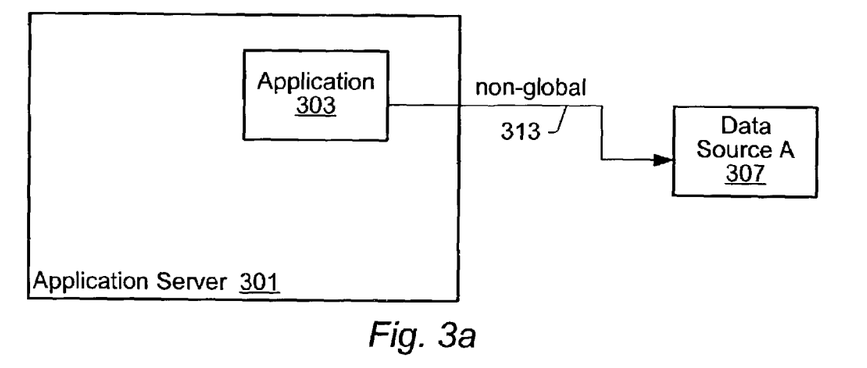
FIGS. 3a, 3b, and 3c show embodiments of an application server accessing data sources through global and non-global connections.

Referring to FIG. 2, a method for managing a transaction is illustrated, according to one embodiment. At block 201, a request may be received by an application server 301 (seen in FIG. 3a) to start a transaction. At block 203, a request to connect to a data source 307 may be received by an application server 301. The request to start a transaction and the connection request may be generated by an application 303 running within the application server 301. The application server 301 may provide a non-global connection 313 to a data source 307 such as but not limited to a database 109 (as seen in FIG. 1). At decision block 205, the application server 301 may determine whether the request is an initial request or for the same data source that was requested by the initial request. If the request is the initial request or a request for the same data source as the initial request, a non-global transaction connection 313 may be provided by the application server 301, as indicated at 207. For example, in one embodiment shown in FIG. 3a, an application server 301 may provide a non-global connection 313, such as but not limited to a Java Data Base Connectivity (JDBC) connection, to a data source 307. A non-global transaction connection 313 may be a connection that does not support a two-phase commit protocol for transactions. For the initial data source 307, the transaction may be managed as a non-global transaction, as indicated at 209. If no more data source connection requests are received (i.e. data source 307 is the only data source accessed by the application 303 in the transaction), the transaction may commit as a non-global transaction using a one phase commit protocol, as indicated at 211 and 213. By holding off creation of a global transaction, the application server 301 may not have to handle the overhead of a global transaction, and, if a global transaction is needed, the application server 301 may have flexibility to start the global transaction when it become necessary. If there are more requests, at block 203, the application server 301 may receive the additional connection request to connect to the requested data source and again determine if the request for the same data source that was requested by the initial request, as indicated at 205.

Figure 3B:
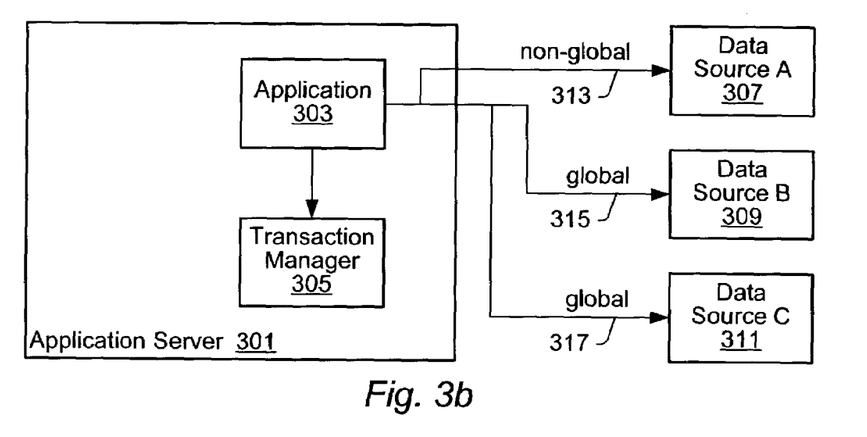

If at decision block 205, an application server 301 determines that the request is not an initial request and is not for the same data source as the initial request, the transaction may be promoted to a global transaction, as indicated at 215. At block 217, a global transaction connection 315 (seen in FIG. 3b) may be provided. For example, a connection such as but not limited to an XAResource connection may be provided for a global transaction. A global transaction connection 315 may be a connection that supports a two phase commit protocol. As seen in FIG. 3b, in one embodiment, an application server 301 running an application 303 may use a transaction manager 305. A global connection 315 may be provided to a data source 309. At decision block 219, the application server 301 may determine if there are any more requests. If there are more requests, at block 217 a global transaction connection 317 may be provided to the request. For example, as seen in FIG. 3b, in one embodiment, an application server 301 may provide a global connection 315 to the data source 309 and a global connection 317 to the data source 311. If there are no more requests, at block 221, a transaction may be committed using a two phase commit protocol. In the two phase commit, before a transaction is committed to the connected data sources, such as data source 309 and data source 311, each data source participating in the two phase commit may be asked to prepare to commit. If each data source is able to commit, each data source may send a response to the transaction manager 305 indicating it is prepared to commit. After the data sources have indicated that they are prepared to commit, the transaction manager 305 may send a signal to commit the transaction to each data source and record the transaction in a transaction log. The initially-requested data source 307, for which a non-global transaction connection was supplied, may be committed in the transaction as a last agent using a last agent optimization. Under the last agent optimization, the last resource to be committed for a transaction may be committed in a single commit phase once all other resources has responded affirmatively to the prepare phase. Thus, the non-global transaction for the initially requested resource may be accommodated using a last agent optimization.

Figure 3C:
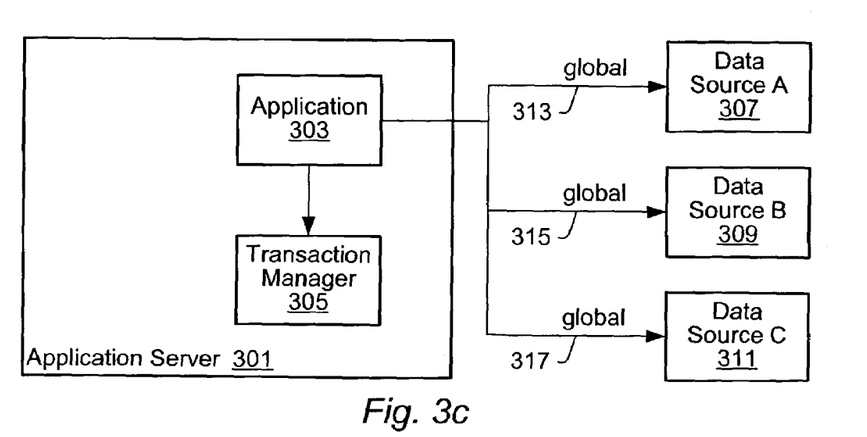

In another embodiment, in response to an initial request by the application 303 for a connection to a first one of a plurality of data sources, such as data source 307, data source 309, and data source 311, an application server 301 may be configured to provide to the application 303 a global transaction connection 313 (e.g. an XAResource connection) for the first data source, such as data source 307 (seen in FIG. 3c). However, even though a global transaction connection 313 is provided, the transaction with the first data source 307 may initially be managed as a non-global transaction. Thus, initially no transaction manager 305 may be involved. Even though a global transaction connection 313 is provided for the first requested data source 307 in a transaction, the connection 313 may initially be used as a non-global connection and the transaction managed as a non-global transaction. Once a connection to a second data source 309 is requested, the transaction may be promoted to a global transaction. For example, if data source 309 is subsequently accessed by application 303 in the same transaction, the transaction may be promoted to be managed by a transaction manager 305. Also, since the transaction connection to the first data source 307 was initially provided as a global transaction connection 313 (even though the transaction was initially managed as a non-global transaction) the connection to the first data source 307 may be promoted to be managed globally as part of the global transaction.

Figure 4:
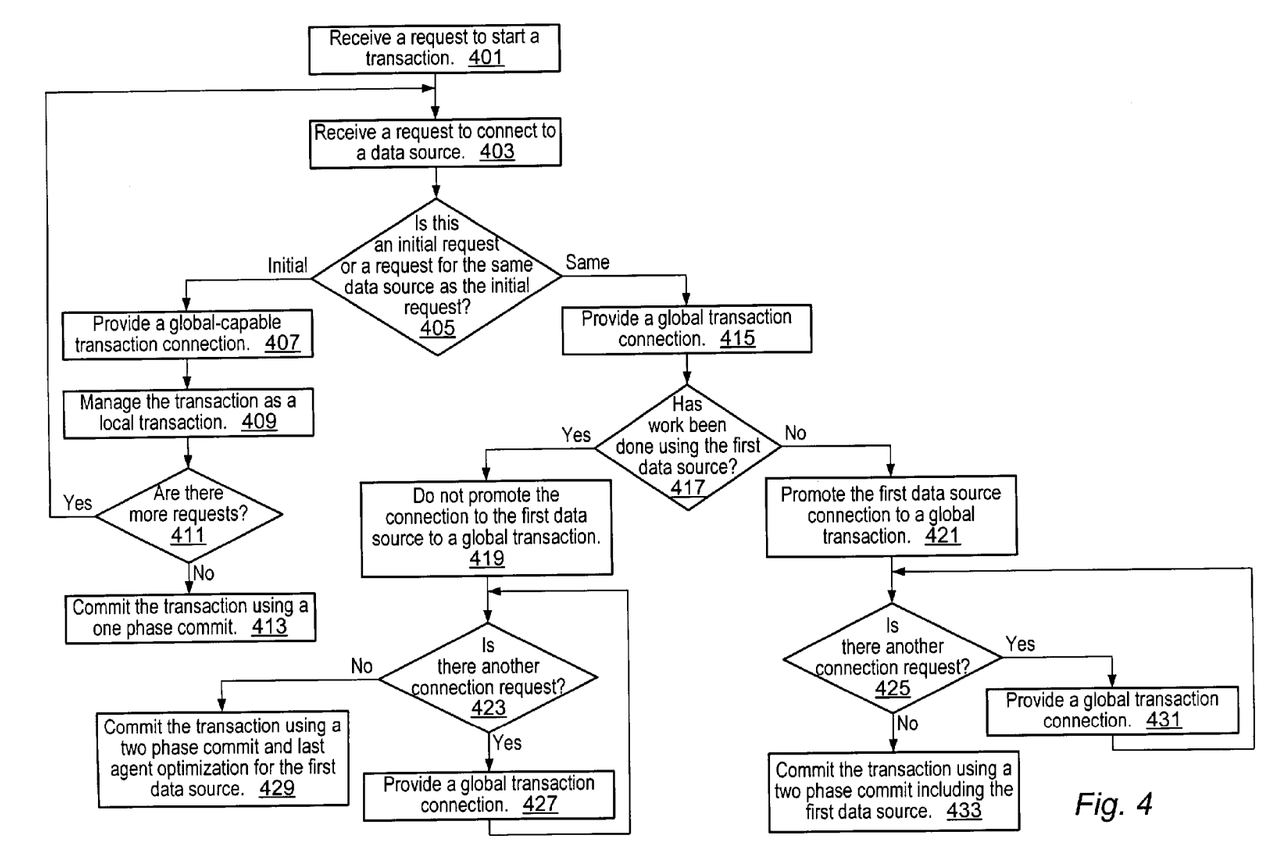
FIG. 4 shows an embodiment of a flowchart for promoting first data source connections to global if no work is done on the first data source prior to connecting to a second data source.
Figure 5A:
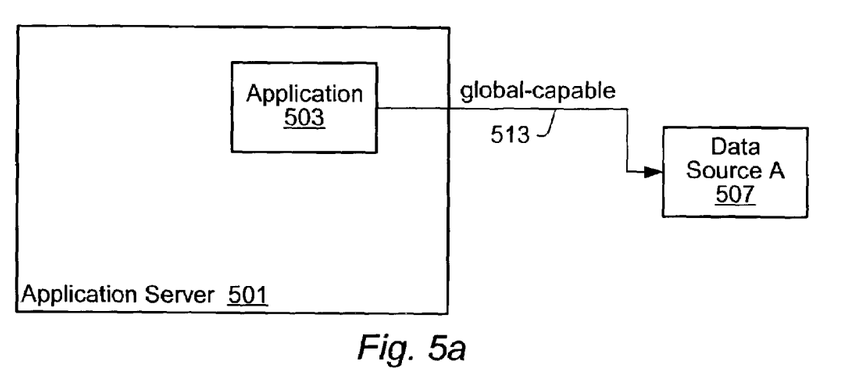
FIGS. 5a, 5b, and 5c show embodiments of an application server accessing data sources through global, non-global, and global-capable connections.
Figure 5B:
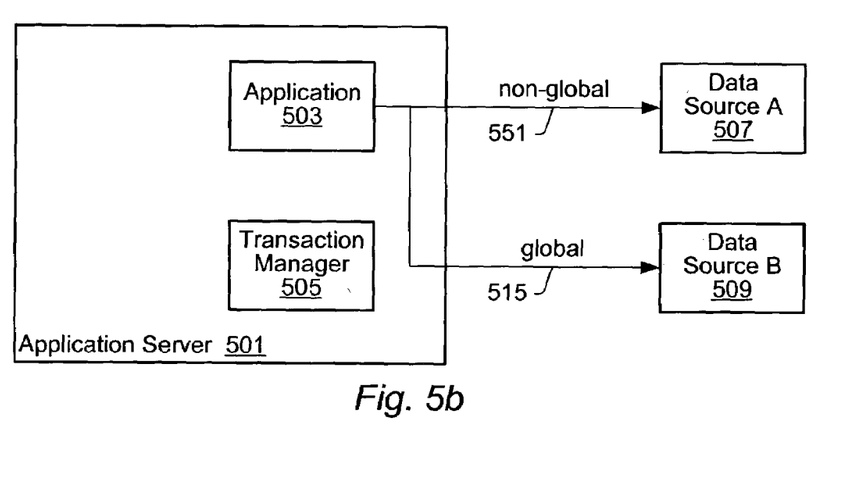

Referring to FIG. 4, in one embodiment, a first data source may be promoted from being managed in a non-global transaction to being managed as part of a global transaction. At block 401, a request may be received by an application server 501 to start a transaction. At block 403, the request may be received to connect to a data source, such as but not limited to data source 507 (seen in FIG. 5a). At decision block 405, an application server 501 may determine if the request is an initial request or if the request is for the same data source as the initial request. If the request is an initial request or for the same data source as the initial request, at block 407, a global-capable connection 513 (seen in FIG. 5a) i.e., a connection capable of participating in a global transaction but not committed to a global transaction) is provided. Even though a global-capable connection is provided, the connection may initially be used as a non-global connection and the transaction may be managed as a non-global transaction, as indicated at 409. For example, in one embodiment, a transaction may be begun with the following code:

UserTransaction utx=new UserTransaction( );
utx.begin( );

without calling XAResource.start( ). XAResource.start( ) will be called if a second data source 509 (seen in FIG. 5b) is connected to and no work has been done on the first connection 513. Other code may also be within the scope of the invention.

At decision block 411, an application server 501 may determine if there are any more requests. If there are more requests, at block 403, the application server 501 may receive a request to connect to a data source 509. If there are no more requests (i.e., the first data source 507 is the only data source requested in the transaction), at block 413, the transaction may be committed as a non-global transaction using a one phase commit protocol.

For subsequent connection requests in the same transaction, if, at decision block 405, the application server 501 determines that the request is not an initial request and does not use the same data source as the initial request, at block 415, a global transaction connection may be provided in response to the request for a connection to the additional data source. At decision block 417, the application server 501 may determine whether work has been done using the first data source 507 requested. If work has been done using the first data source 507 requested, at block 419, the first data source 507 may continue to be managed as a non-global transaction with a non-global connection 551 (seen in FIG. 5b). The transaction resource connections (except for the first-requested resource) may be managed by a transaction manager. At decision block 423, the application server 501 may determine whether there are any more connection requests. If there are more connection requests, at block 427, a global transaction connection may be provided, and at decision block 423, the application server 501 may again determine if there are any more connection requests.

If there are no more requests, at block 429, the transaction may be committed using a two phase commit protocol and last agent optimization for the first data source 507 in the transaction. In one embodiment of last agent optimization, all of the data sources besides the first data source 507 may participate in a two phase commit protocol while the first data source 507 participates in the transaction using a one phase commit protocol. For example, all of the data sources besides the first data source 507 may be asked if they are prepared to commit. If the other data sources reply affirmatively, the first data source 507 (i.e. the last agent) may be instructed to commit the transaction. If the first data source 507 commits the transaction, the other data sources may be instructed to commit the transaction and the transaction may be recorded in a transaction log.

Figure 5C:
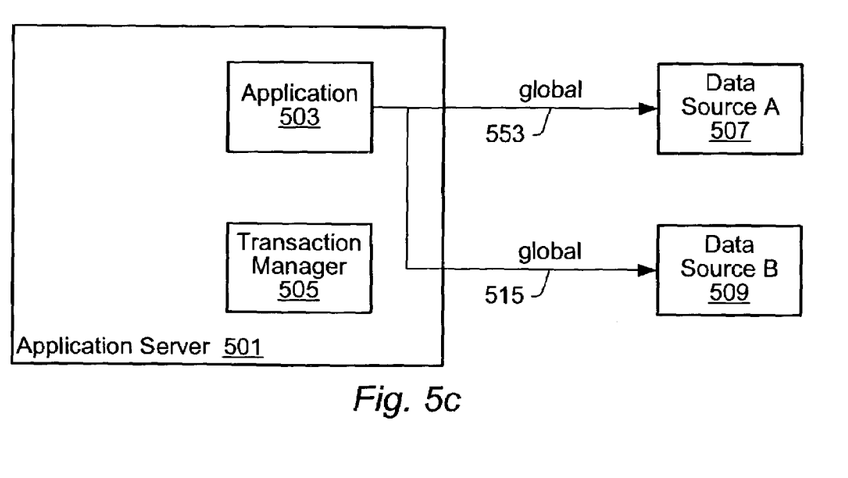

At decision block 417, if work has not been done using the first data source 507, at block 421, the first data source 507 may be promoted to being managed as a global transaction with a global connection 553 (seen in FIG. 5c). Promoting the first data source 507 to being managed by a transaction manager 505 may allow a different data source to be the last agent in a last agent optimization. At decision block 425, an application server 501 may determine whether there are any more requests. If there are more requests, at block 431, the requested data source may be provided a global transaction connection. The application server 501 may again determine if there are any more requests at decision block 425. If there are no more requests, at block 433, a transaction may be committed using a two phase commit protocol including the first data source 507.

Figure 6:
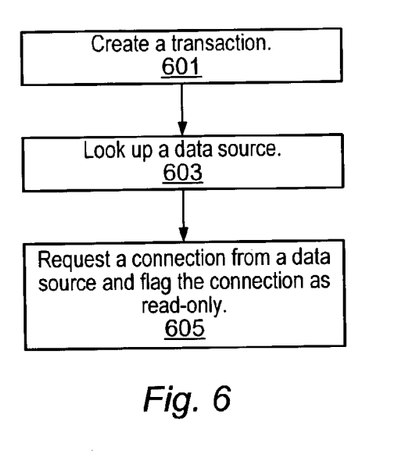
FIG. 6 shows an embodiment of a flowchart for designating a connection to a data source as read-only.

Referring to FIG. 6, in one embodiment, a connection to a data source may be designated as read-only. Read-only data sources may not need to be managed within a transaction. Designating the read-only data sources as read-only at a connection level or a data source level may allow read-only data sources to be excluded from transaction management. Read-only data sources may be designated at the connection or data source level programmatically. Lists of read-only data sources may alternatively be kept in a registry file.

FIG. 6 illustrates a method for programmatically setting a resource as read-only at the connection level. For example, at block 601, in FIG. 6, a transaction may be created. At block 603, a data source may be looked up. At block 607, the application server may establish a connection with the data source with a read-only flag set to true. For example in one embodiment, the read-only flag in a connection may be set to true using the following code:

inCtx=new initialContext( );
ds=inCtx.lookup("jdbc/testDB");
ds.getConnection(user,passw,readonly)

In one embodiment, if the connection is designated as read-only, other connections to the same data source may not be treated as read-only unless those connections are also designated as read-only. For example, if the data source is accessed again, a new connection to the data source may need to be marked read-only again.

Figure 7:
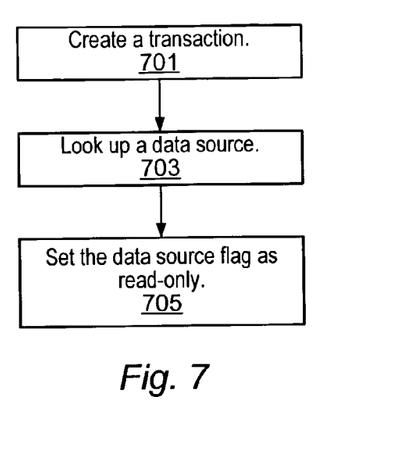
FIG. 7 shows an embodiment of a flowchart for designating a data source as read-only at the data source level.

Referring to FIG. 7, in one embodiment, a data source may be designated as read-only at the data source level. At block 707, a transaction may be created. At block 703, a data source may be looked up. At block 707, the data source may be designated as read-only at the data source level. For example in one embodiment, the data source may be designated read-only at the data source level using the following code:

inCtx=new initialContext( );
ds=inCtx.lookup("jdbc/testDB");
ds.setReadOnly( )

If a reference is designated as read-only at a data source level, other connections provided by an application server to the reference may also be treated as read-only. For example, if an application server accesses the data source using another connection, the application server may check or look at a flag at the data source level that may have been previously marked read-only. The application server may then treat the connection to that data source as read-only.

In another embodiment, a data source may be designated as read-only in a registry file. A transaction may be created and a data source may be looked up. The data source may be designated as read-only on a registry file by a programmer. Other sources for the registry file may also be within the scope of the invention. Data sources designated as read-only on a registry may continue to be treated as read-only for connections by application servers that can access the registry. In addition, other applications may also continue to use the registry file. Application servers may check the registry each time a data source is accessed to determine if the data source is read-only. In addition, the registry file may be used for other transactions in the application server.

Figure 8:
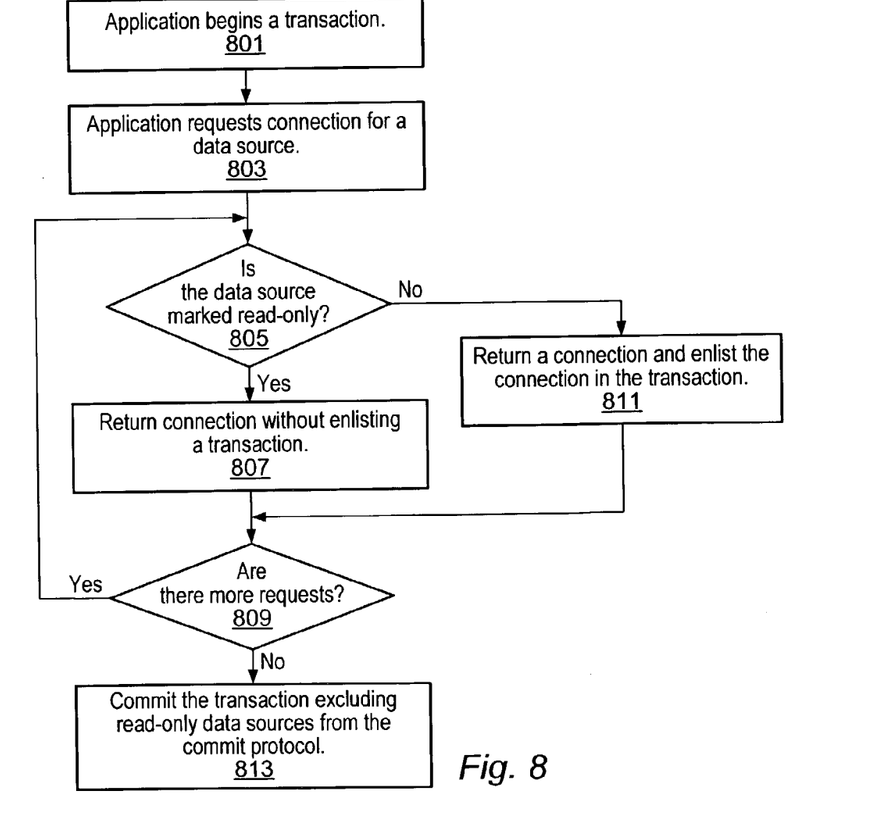
FIG. 8 shows an embodiment of a flowchart for managing transactions by excluding read-only data sources.

Referring to FIG. 8, an embodiment is shown in the form of a flowchart with read-only resources excluded from a transaction. At block 801, an application may begin a transaction. At block 803, an application may request a connection for a data source. At decision block 805, an application server may determine if the data source requested is marked read-only. If the requested data source is marked read-only, at block 807, a connection may be returned without enlisting a transaction. If the requested data source is not marked read-only, at block 811, a connection may be returned and the connection may be enlisted in the transaction. At decision block 809, the application server may determine if there are any more requests. If there are more requests, at decision block 805, an application server may determine if the requested data source is marked read-only. If there are no more requests, at block 813, the transaction may be committed excluding read-only data source from the commit protocol. In one embodiment, if an application server attempted to write to a read-only data source, an exception may be returned.

Figure 9:
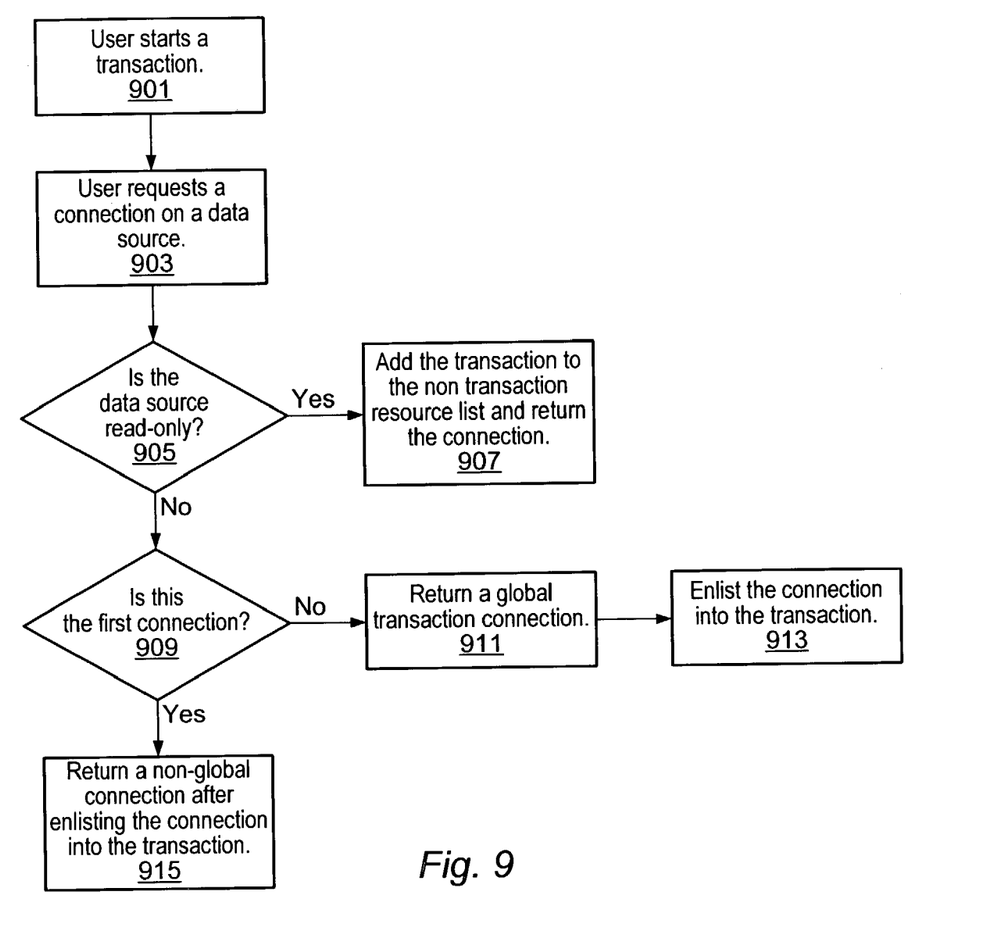
FIG. 9 shows an embodiment of a flowchart for providing a non-global transaction after considering the number of non-read-only data sources involved in the transaction.
Figure 11A:
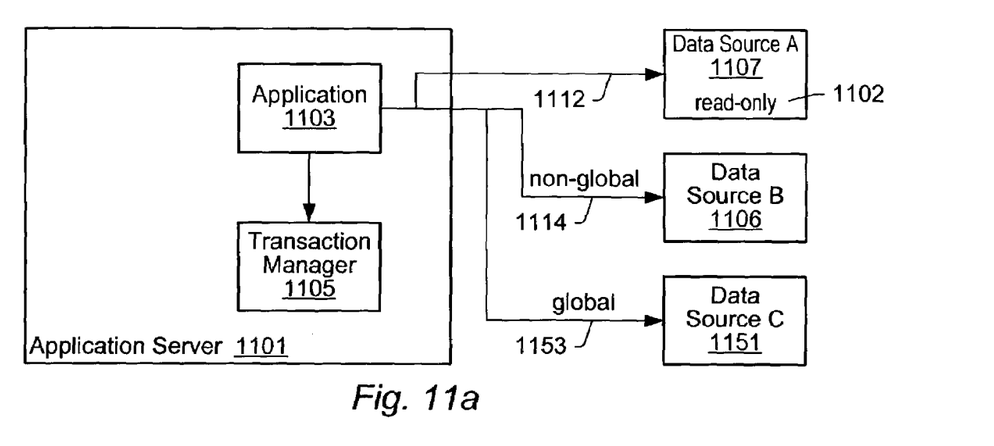
FIGS. 11a, 11b, and 11c show embodiments of an application server accessing read-only and non-read-only data sources.
Figure 11B:
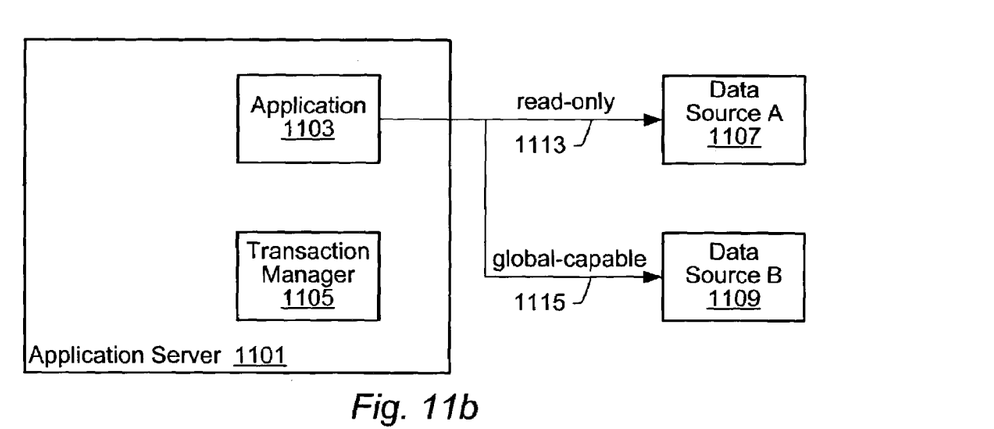
Figure 11C:
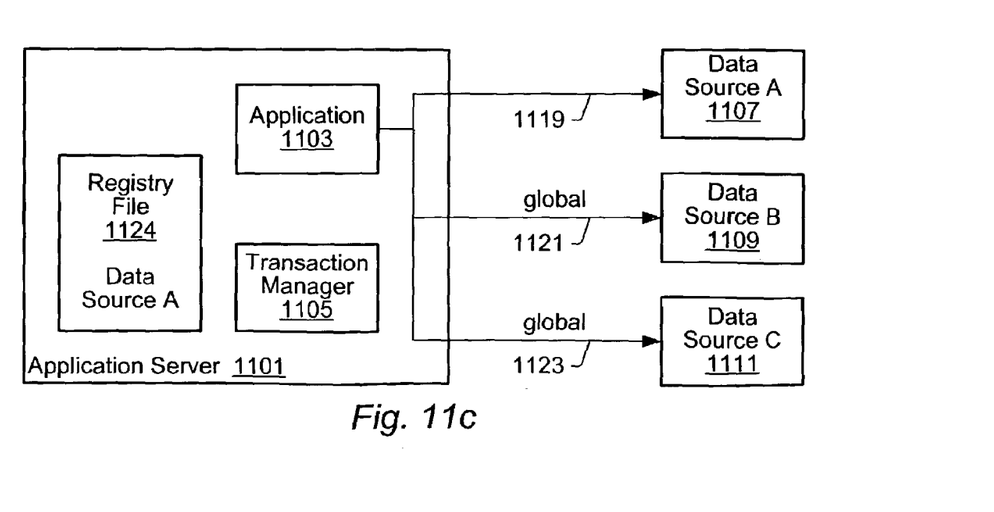

Referring to FIG. 9, in one embodiment, read-only data sources may be excluded from transaction management. At block 901, a user (or an application 1101 as seen in FIG. 11A, FIG. 11B, and FIG. 11C) may begin a transaction. At block 903, a user may request a connection for a data source, such as data source 1107. At block 905, an application server 1101 may determine if the requested data source is read-only. The application server 1101 may check a read-only flag at the data source level (such as read-only flag 1102 on data source 1107 in FIG. 11A) to see if the data source 1107 was previously designated as read-only. Other methods of designating the data source 1107 as read-only may also be within the scope of the invention. The application server 1101 may also designate the data source as read-only at a connection level by marking a read-only flag on the connection (such as read-only connection 1113 on data source 1107 in FIG. 11B). If the data source 1107 is designated read-only, at block 907, a connection 1112 may be returned and the transaction may be added to the non transaction list.

Figure 10:
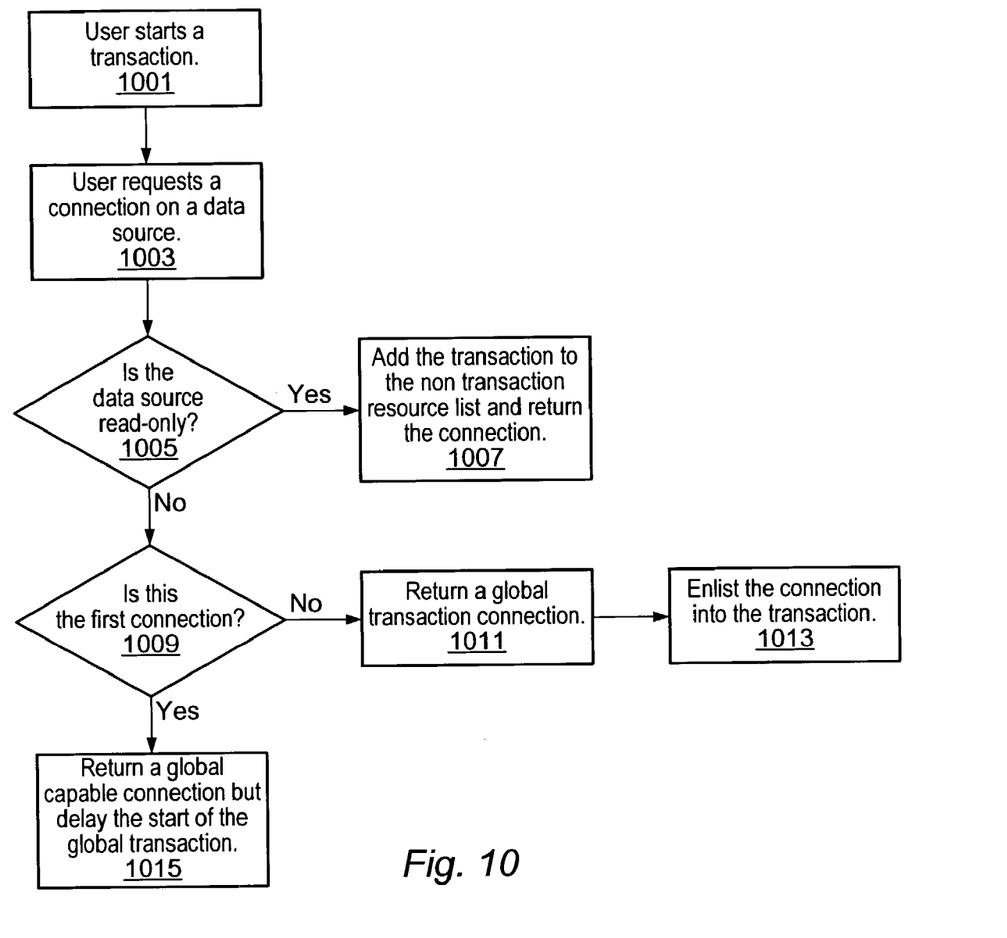
FIG. 10 shows an embodiment of a flowchart for providing a global-capable connection after considering the number of non-read-only data sources involved in the transaction.

If the data resource is not read-only, at decision block 909, the application server 1101 may determine if the requested connection is the first connection requested. If the requested connection is the first requested connection, at block 915, a non-global connection 1114 may be returned after enlisting the connection 1114 into the transaction. If the requested connection is not the first connection, at block 911, a global transaction connection may be returned (such as global transaction connection 1153 to data source 1151 in FIG. 11a). If a global transaction connection 1153 is established, a transaction manager 1105 may manage the transaction. Recognizing read-only data sources may allow the application server 1101 to hold off creating a global transaction in order to avoid the overhead of a global transaction. If a global transaction becomes necessary, the application server 1101 may have the flexibility to start the global transaction. At block 913, the connection may be enlisted into the transaction. Referring to FIG. 10, at block 1009, analogous to block 909 in FIG. 9, an application server 1101 may determine if the requested connection is the first connection. If the requested connection is the first connection, at block 1015, a global-capable connection may be returned (for example, global-capable connection 1115 to data source 1109 in FIG. 11b), but a start of a global connection may be delayed until a different non-read-only data source is requested. For example, referring to FIG. 11c, a global-capable connection 1115 may become a global connection 1121 when a data source 1111 is requested and a global connection 1123 is returned for data source 1111. A transaction manager 1105 may manage the transaction. In one embodiment, if an application server 1101 attempted to write to a read-only data source, an exception may be returned.

Figure 12:
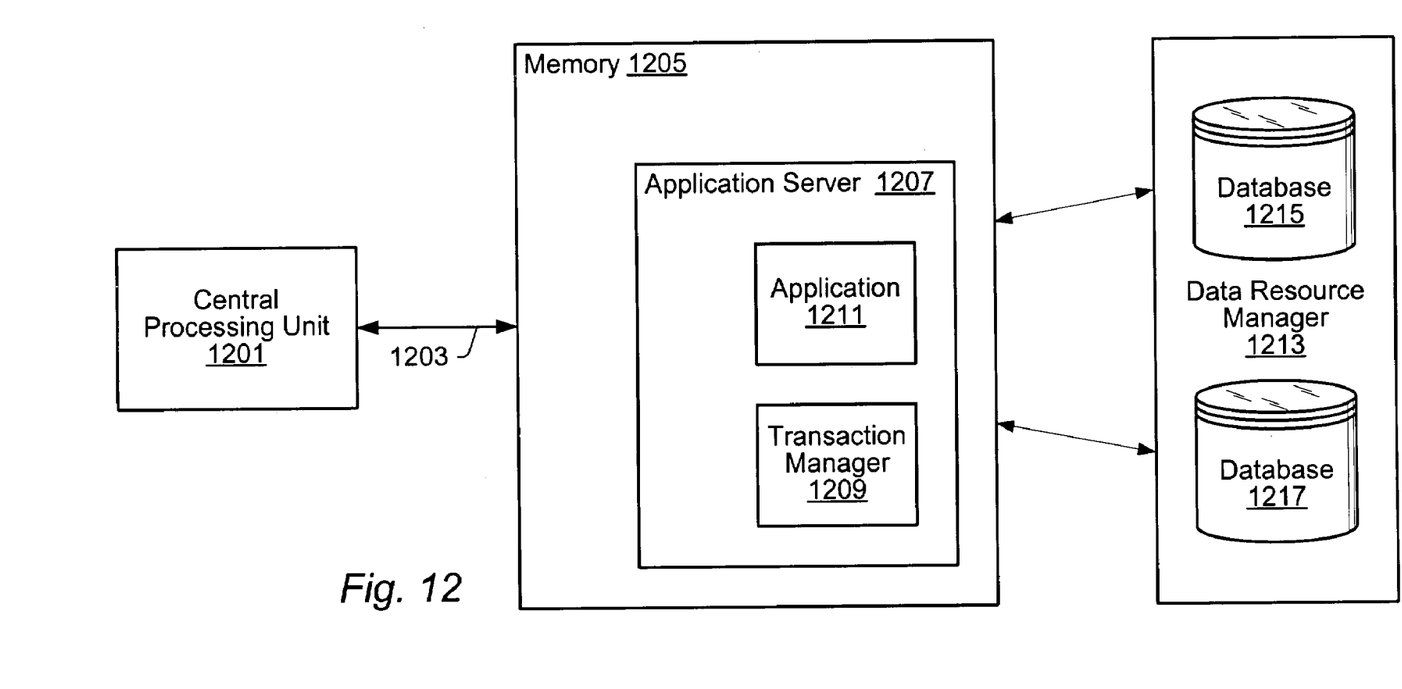
FIG. 12 shows an embodiment of a computer system for managing transactions.

Referring to FIG. 12, in one embodiment, a computer system for implementing an application and an application server is shown. A computer system 1200 may include components such as but not limited to a memory medium 1205, a central processing unit (CPU) or processor 1201, and an input/output (I/O) interface 1203. The CPU 1201 may use memory 1205 to drive an application 1211 and transaction manager 1209 on an application server 1207. The application server 1207 may access a database 1215 and database 1217 having a resource manager 1213. The Interconnect 1203 may communicate data from one component to another. For example, interconnect 1203 may be an interconnect such as but not limited to a point-to-point interconnect, a shared bus, a combination of point-to-point interconnects and one or more buses, or a bus hierarchy including a system bus, CPU bus, memory bus and I/O buses such as a peripheral component interconnect (PCI) bus.

The memory medium 1205 may store computer programs to implement an application and application server. Other computer programs may also be within the scope of the invention. The memory medium may include an installation medium, such as but not limited to a CD-ROM, or floppy disk; a computer system memory such as but not limited to DRAM, SRAM, EDO DRAM, SDRAM, DDR SDRAM, Rambus RAM, or a non-volatile memory such as a magnetic media, such as but not limited to a hard drive 1230, or optical storage. The memory medium 1205 may also include combinations of memory mediums. The memory medium 1205 may be located in a first computer in which the programs are executed, or may be located in a second different computer, coupled to the first computer over a network. The second computer may provide the program instructions to the first computer for execution.

The computer system 1200 may be a computer such as but not limited to a personal computer system, mainframe computer system, workstation, network appliance, Internet appliance, personal digital assistant (PDA), or television system. The computer system 1200 may encompass any device having a processor, which executes instructions from a memory medium 1205. The memory medium 1205 may store a software program for event-triggered transaction processing. The software program may be implemented using techniques such as but not limited to procedure-based techniques, component-based techniques, and object-oriented techniques. For example, the software program may be implemented using software such as but not limited to ActiveX controls, C++ objects, JavaBeans, Microsoft Foundation Classes (MFC).

Referring to FIG. 2, FIG. 4, FIG. 6, FIG. 7, FIG. 8, FIG. 9, and FIG. 10, various embodiments may further include receiving, sending, or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or wireless link.

Note that the flow charts described herein represent exemplary embodiments of methods. The methods may be implemented in software, hardware, or a combination thereof. The order of method may be changed, and various elements may be added, reordered, combined, omitted or modified.

Various modifications and changes may be made to the invention as would be obvious to a person skilled in the art having the benefit of the disclosure. It is intended that that the following claims be interpreted to embrace all such modifications and changes and, accordingly, the specifications and drawings are to be regarded in an illustrative rather than a restrictive sense.

We claim:

1. A system, comprising:
   one or more processors;
   memory coupled to the one or more processors and configured to store program instructions executable by the one or more processors to implement:
      an application configured to request access to a plurality of data sources during a transaction, wherein one or more of the data sources are marked as read-only; and
      an application server configured to:
         manage the transaction for the plurality of data sources;
         complete the transaction according to a transaction commit protocol;
         determine which of the one or more data sources are marked as read-only; and
         completely exclude from the transaction commit protocol the one or more data sources marked as read-only.

2. The system as recited in claim 1, wherein to access one of the data sources, the application is configured to request a connection to a data source.

3. The system as recited in claim 2, wherein the application server is configured to provide the connection as part of the transaction if the connection is not marked by the application as read-only, and wherein the application server is configured to provide the connection as not part of the transaction if the connection is marked by the application as read-only.

4. The system as recited in claim 2, wherein the application server is configured to provide the connection as part of the transaction if the data source is not marked as read-only, and wherein the application server is configured to provide the connection as not part of the transaction if the data source is marked as read-only.

5. The system as recited in claim 4, wherein the application is configured to mark the data source as read-only.

6. The system as recited in claim 4, wherein the data source is marked as read-only in a registry file.

7. The system as recited in claim 4, wherein for all connection requests from the application for a data source marked as read-only, the application server is configured to provide the corresponding connections as not part of the transaction.

8. The system as recited in claim 2, wherein the data source is a database.

9. The system as recited in claim 2, wherein in response to a request from the application for a connection to a data source for a first data source not marked as read-only, the application server is configured to provide a non-global transaction connection for the data source and continue to manage the transaction as a non-global transaction if said data source not marked as read-only is the only data source not marked as read-only for which the application has requested access.

10. The system as recited in claim 9, wherein if the first data source is the only data source not marked as read-only accessed by the application during the transaction, the application server is configured to manage the entire transaction as a non-global transaction, wherein the transaction is completed using a one phase commit protocol.

11. The system as recited in claim 9, wherein if one or more additional data sources not marked as read-only are subsequently accessed by the application, the application server is configured to provide a global transaction connection to each other data source not marked as read-only and change the transaction to be managed as a global transaction.

12. The system as recited in claim 11, wherein if the transaction is managed as a global transaction, the application server is configured to complete the transaction using a two phase commit protocol.

13. The system as recited in claim 12, wherein if the transaction is managed as a global transaction, the application server is further configured to complete the transaction using a last agent optimization with the first data source performing a one phase commit protocol to commit or rollback the transaction.

14. The system as recited in claim 2, wherein in response to a request from the application for a connection to a data source for a first data source not marked as read-only, the application server is configured to provide a global transaction connection for the data source and continue to manage the transaction as a non-global transaction if said data source not marked as read-only is the only data source not marked as read-only for which the application has requested access.

15. The system as recited in claim 14, wherein if the first data source is the only data source not marked as read-only accessed by the application during the transaction, the application server is configured to manage the entire transaction as a non-global transaction, wherein the transaction is completed using a one phase commit protocol.

16. The system as recited in claim 14, wherein if one or more additional data sources not marked as read-only are subsequently accessed by the application, the application server is configured to provide a global transaction connection to each other data source not marked as read-only and change the transaction to be managed as a global transaction.

17. The system as recited in claim 16, wherein if the transaction is managed as a global transaction, the application server is configured to complete the transaction using a two phase commit protocol.

18. The system as recited in claim 17, wherein if the transaction is managed as a global transaction and if no work was performed during the transaction on the first data source, the application server is further configured to complete the transaction using a last agent optimization with the first data source performing a one phase commit protocol to commit or rollback the transaction.

19. The system as recited in claim 17, wherein if the transaction is managed as a global transaction and if work was performed during the transaction on the first data source, the application server is further configured to include the first data source in the two phase commit protocol.

20. The system as recited in claim 1, wherein upon completion of the transaction, the application server is configured to perform a transaction commit protocol for each access to the one or more data sources that are part of the transaction and not perform the transaction commit protocol for each access to the one or more data sources marked as read-only.

21. A computer-implemented method, comprising:
    a transaction manager receiving a request from an application to begin a transaction;
    the transaction manager receiving a request from the application for a connection to a data source for a data source;
    the transaction manager determining if the data source is marked as read-only;
    if the data source is marked as read-only, the transaction manager returning the connection to the application without enlisting the connection in the transaction; and
    if the data source is not marked as read-only, the transaction manager returning the connection to the application and enlisting the connection within the transaction.

22. The method as recited in claim 21, further comprising, in response to said receiving a request for a connection to a data source, checking a flag passed by the connection request to determine if the data source is marked read-only.

23. The method as recited in claim 21, further comprising, in response to said receiving a request for a connection to a data source, checking a registry file to determine if the data source is marked read-only.

24. The method as recited in claim 21, further comprising performing a transaction commit protocol only for data sources that were determined to not be read-only when connections for the data sources were requested, wherein the transaction commit protocol is not performed for data sources that were determined to be read-only when connections for data sources were requested.

25. The method as recited in claim 21, wherein said receiving a request for a connection to a data source comprises receiving a request for a connection to a database.

26. The method as recited in claim 21, wherein if the data source is not marked as read-only, said returning the connection and enlisting the connection within the transaction comprises providing a non-global transaction connection for the data source and continuing to manage the transaction as a non-global transaction if the data source is the only data source not marked as read-only for which a connection has been requested in the transaction.

27. The method as recited in claim 26, further comprising, if the first data source is the only data source not marked as read-only for which a connection has been requested in the transaction, managing the entire transaction as a non-global transaction and completing the transaction using a one phase commit protocol.

28. The method as recited in claim 26, further comprising, if one or more additional data sources different not marked as read-only are subsequently accessed in the transaction, providing a global transaction connection to each other data source not marked as read-only and changing the transaction to be managed as a global transaction.

29. The method as recited in claim 28, further comprising completing the transaction using a two phase commit protocol if the transaction is managed as a global transaction.

30. The method as recited in claim 29, wherein said completing the transaction further comprises completing the transaction using a last agent optimization with the first data source performing a one phase commit protocol to commit or rollback the transaction if the transaction is managed as a global transaction.

31. The method as recited in claim 26, wherein if the data source is not marked as read-only, said returning the connection and enlisting the connection within the transaction comprises providing a global transaction connection for the data source and continuing to manage the transaction as a non-global transaction if the data source is the only data source not marked as read-only for which a connection has been requested in the transaction.

32. The method as recited in claim 31, further comprising managing the entire transaction as a non-global transaction and completing the transaction using a one phase commit protocol if the first data source is the only data source not marked as read-only accessed during the transaction.

33. The method as recited in claim 31, further comprising, if one or more additional data sources not marked as read-only are subsequently accessed during the transaction, providing a global transaction connection to each other data sources and changing the transaction to be managed as a global transaction.

34. The method as recited in claim 33, further comprising completing the transaction using a two phase commit protocol if the transaction is managed as a global transaction.

35. The method as recited in claim 34, wherein said completing the transaction comprises completing the transaction using a last agent optimization with the first data source performing a one phase commit protocol to commit or rollback the transaction if the transaction is managed as a global transaction and if no work was performed during the transaction on the first data source.

36. The method as recited in claim 34, wherein said completing the transaction comprises including the first data source in the two phase commit protocol if the transaction is managed as a global transaction and if work was performed during the transaction on the first data source.

37. A computer readable storage medium, comprising program instructions, wherein the program instructions are computer-executable to implement:
a transaction manager receiving a request from an application to begin a transaction;
the transaction manager receiving a request from the application for a connection to a data source for a data source;
if the data source is marked as read-only, the transaction manager returning the connection to the application without enlisting the connection in the transaction; and
if the data source is not marked as read-only, the transaction manager returning the connection to the application and enlisting the connection within the transaction.

38. The computer readable storage medium as recited in claim 37, further comprising, in response to said receiving a request for a connection to a data source, checking a flag passed by the connection request to determine if the data source is marked read-only.

39. The computer readable storage medium as recited in claim 37, further comprising, in response to said receiving a request for a connection to a data source, checking a registry file to determine if the data source is marked read-only.

40. The computer readable storage medium as recited in claim 37, further comprising performing a transaction commit protocol only for data sources that were determined to not be read-only when connections for the data sources were requested, wherein the transaction commit protocol is not performed for data sources that were determined to be read-only when connections for data sources were requested.

41. The computer readable storage medium as recited in claim 37, wherein said receiving a request for a connection to a data source comprises receiving a request for a connection to a database.

42. The computer readable storage medium as recited in claim 37, wherein if the data source is not marked as read-only, said returning the connection and enlisting the connection within the transaction comprises providing a non-global transaction connection for the data source and continuing to manage the transaction as a non-global transaction if the data source is the only data source not marked as read-only for which a connection has been requested in the transaction.

43. The computer readable storage medium as recited in claim 42, further comprising, if the first data source is the only data source not marked as read-only for which a connection has been requested in the transaction, managing the entire transaction as a non-global transaction and completing the transaction using a one phase commit protocol.

44. The computer readable storage medium as recited in claim 42, further comprising, if one or more additional data sources different not marked as read-only are subsequently accessed in the transaction, providing a global transaction connection to each other data source not marked as read-only and changing the transaction to be managed as a global transaction.

45. The computer readable storage medium as recited in claim 44, further comprising completing the transaction using a two phase commit protocol if the transaction is managed as a global transaction.

46. The computer readable storage medium as recited in claim 45, wherein said completing the transaction further comprises completing the transaction using a last agent optimization with the first data source performing a one phase commit protocol to commit or rollback the transaction if the transaction is managed as a global transaction.

47. The computer readable storage medium as recited in claim 42, wherein if the data source is not marked as read-only, said returning the connection and enlisting the connection within the transaction comprises providing a global transaction connection for the data source and continuing to manage the transaction as a non-global transaction if the data source is the only data source not marked as read-only for which a connection has been requested in the transaction.

48. The computer readable storage medium as recited in claim 47, further comprising managing the entire transaction as a non-global transaction and completing the transaction using a one phase commit protocol if the first data source is the only data source not marked as read-only accessed during the transaction.

49. The computer readable storage medium as recited in claim 47, further comprising, if one or more additional data sources not marked as read-only are subsequently accessed during the transaction, providing a global transaction connection to each other data sources and changing the transaction to be managed as a global transaction.

50. The computer readable storage medium as recited in claim 49, further comprising completing the transaction using a two phase commit protocol if the transaction is managed as a global transaction.

51. The computer readable storage medium as recited in claim 50, wherein said completing the transaction comprises completing the transaction using a last agent optimization with the first data source performing a one phase commit protocol to commit or rollback the transaction if the transaction is managed as a global transaction and if no work was performed during the transaction on the first data source.

52. The computer readable storage medium as recited in claim 50, wherein said completing the transaction comprises including the first data source in the two phase commit protocol if the transaction is managed as a global transaction and if work was performed during the transaction on the first data source.

* * * * *